(12) United States Patent
Bakir et al.

(10) Patent No.: US 6,843,895 B2
(45) Date of Patent: Jan. 18, 2005

(54) PORTABLE DEVICE FOR ELECTROCHEMICAL PROCESSING OF LIQUIDS

(75) Inventors: Vitold M. Bakir, Moscow (RU); Svetlana A. Panicheva, Creve Coeur, MO (US); Yuri G. Zadorozhni, Moscow (RU)

(73) Assignee: Electro-Chemical Technologies Ltd., Las Vegas, NV (US)

(*) Notice: Subject to any disclaimer, the term of this patent is extended or adjusted under 35 U.S.C. 154(b) by 0 days.

(21) Appl. No.: 10/177,548

(22) Filed: Jun. 21, 2002

(65) Prior Publication Data

US 2003/0015419 A1 Jan. 23, 2003

(30) Foreign Application Priority Data

Jun. 21, 2001 (RU) ........................................ 2001116690

(51) Int. Cl.[7] ................................................ C25B 9/00
(52) U.S. Cl. ........................................ 204/260; 204/271
(58) Field of Search ................................. 204/260, 271

(56) References Cited

U.S. PATENT DOCUMENTS

| | | | | |
|---|---|---|---|---|
| 4,248,715 A | * | 2/1981 | Olivier | 204/260 |
| 4,290,873 A | * | 9/1981 | Weaver | 204/230.2 |
| 5,051,161 A | | 9/1991 | Yamaguchi et al. | |
| 5,427,667 A | | 6/1995 | Bakhir et al. | |
| 5,540,819 A | | 7/1996 | Bakhir et al. | |
| 5,628,888 A | | 5/1997 | Bakhir et al. | |
| 5,635,040 A | | 6/1997 | Bakhir et al. | |
| 5,783,052 A | | 7/1998 | Bakhir et al. | |
| 5,871,623 A | | 2/1999 | Bakhir et al. | |
| 5,985,110 A | | 11/1999 | Bakhir et al. | |
| 6,004,439 A | | 12/1999 | Bakhir et al. | |
| 6,033,539 A | | 3/2000 | Gablenko | |
| 6,086,733 A | | 7/2000 | Carey et al. | |

* cited by examiner

Primary Examiner—Donald R. Valentine
(74) Attorney, Agent, or Firm—Alston & Bird LLP

(57) ABSTRACT

A portable device for the electrochemical processing of liquids which comprises a dielectric casing with cylindrical and coaxially aligned electrodes and an inter-electrode diaphragm partitioning the inter-electrode space into an anode and a cathode chamber, and current lead-ins. The cylindrical diaphragm made of ceramics on the basis of aluminum and zirconium oxides is installed coaxially to the electrodes. The electrodes and diaphragm are tightly fixed to make up an electrode-diaphragm unit whose anode and cathode chambers have elements for inputting and outputting liquids being processed, and the electrode-diaphragm unit itself is tightly fixed within the casing. The casing has ports in which hydraulic connector and an electric connector are tightly installed. Quick-disconnect hydraulic connections are connected on the casing's inner surface with the input and output elements of the electrode-diaphragm unit's anode and cathode chambers. The electric connecter is connected on the casing's inner surface with the current leads-in.

15 Claims, 7 Drawing Sheets a)
b)

PORTABLE DEVICE FOR ELECTROCHEMICAL PROCESSING OF LIQUIDS

FIELD OF INVENTION

The present invention relates to applied electrochemistry, and in particular portable devices for the electrochemical processing of water and/or aqueous solutions for the controlled modification of their properties. The invention is intended for use by individuals, including private physicians, and various medical institutions, health centers, research laboratories, and the like. The invention can be used indoors and outdoors.

BACKGROUND OF THE INVENTION

In many instances it can be necessary to control the properties of water so as to purify and improve its quality and also to produce solutions featuring specific properties, such as disinfecting properties. If water is supplied through pipelines or solutions are produced on an industrial scale, stationary facilities with high productivity may be used. However, an efficient apparatus, which could produce minor amounts of various solutions (especially outdoors), is currently unavailable.

Heretofore, portable devices for processing small amounts of water or aqueous solutions are based on placing an electrode system within a water volume. One such example of a portable device includes a casing and an electrode system that includes a cylindrical coaxial inner anode, outer cathode and a partitioning diaphragm, and current leads-in. See Russian Federation Patent RU 2,040,479. The device also has a power supply unit.

Such a device allows (i) the processing various chemical solutions in the anode and cathode chambers; (ii) altering characteristics of the anolyte and catholyte by varying parameters of the current; and (iii) outputting the processed product from either cathode or anode chambers.

Such devices suffer various disadvantages. The shortcomings of such a device include low productivity and relatively high cost of the processing, as productivity depends on the casing volume. When this volume increases, the inter-electrode distance also increases, and, as a result, energy consumption increases. It is also not possible using such a device to produce water or an aqueous solution processed, for example, first in the cathode, and then in the anode chamber. Moreover, properties of the solutions processed in the available device depend on device's technological characteristics (absolute dimensions and relative distances in the inter-electrode space). Accordingly, prior to using each individual device (for example, in medical institutions) it is necessary to carry out special research to standardize the solutions produced and the device itself.

SUMMARY OF THE INVENTION

The present invention provides a device having the following advantages: (i) increased efficiency of the device; (ii) diminished energy consumption; and (iii) extended functional capacities. These features allow creation of new, inexpensive, all-purpose, reliable, and user-friendly electrochemical units. The device allows users to produce electrochemically activated solutions (anolytes of types A, AN, ANK, and catholyte of type K) from water or low-concentration sodium chloride aqueous solutions in quantities sufficient for individual consumption, and also to cleanse water from microbes, heavy metal ions, and organic chemicals (herbicides, pesticides, phenols, surface-active substances, and oil products). The device may be used outdoors, for example, by travelers and tourists, geologist and rescue teams in remote regions, areas of natural disasters or epidemic, and also in research laboratories, as well as in private apartments and summer houses.

The portable device of the present invention for electrochemical processing of liquids includes a dielectric casing with coaxially placed cylindrical inner anode, outer cylindrical cathode, and an inter-electrode diaphragm partitioning the space between the electrodes into anode and cathode chambers. The diaphragm is cylindrical and made of ceramic materials based on aluminum and zirconium oxides. The diaphragm is installed coaxially to the electrodes. The anode, cathode, and diaphragm are tightly connected within an electrode-diaphragm unit. In addition, the anode and cathode chambers of the electrode-diaphragm unit include inlets and outlets for the liquid being processed.

The electrode-diaphragm unit is fixed within the casing. The unit can be fixed in the casing by clamps and yokes that are cast with the casing or are attached to it. The unit can also be fixed using elastic fillings (for example, synthetic spongy material) which fill in the space between the unit and the casing so that the former cannot be displaced.

The casing further includes ports or holes. Quick-disconnect hydraulic connections and an electric connector are tightly installed in the casing's holes. The device also has elastic pipes. The quick-disconnect hydraulic connections are connected to the inner surface of the casing via inlets and outlets associated with the anode and cathode chambers of the electrode unit. The quick-disconnect hydraulic connections are connected to the outer surface of the casing using flexible pipes. The quick-disconnect hydraulic connections may have a nipple-type design. The electric connector is connected inside the casing with the leads-in of the electrode-diaphragm unit, and outside the casing, with the power supply unit.

Such a design can improve the device characteristics and extend its functional capacities. Placing the electrode-diaphragm unit inside the dielectric casing improves the device's safety. This placement can also reduce the dimensions of the device, because the dimensions in such an arrangement depend only on the dimensions of the electrode-diaphragm unit and do not affect the productivity of the device. The unit itself features a rigid construction so that the inter-electrode distance does not change. This can ensure the stability of the processing characteristics and simplify device maintenance.

The inlets and outlet of the electrode chamber for liquids being processed may vary depending on the way the electrode-diaphragm unit is incorporated into the rigid construction. Such inlets and outlets may be either pipes installed on the electrodes (or in the holes on the surface of the electrodes) or part of a construction used for tight connection of the electrodes. The electrode chamber's inlets and outlets make it possible to (i) run the device in flow mode; (ii) process different chemical substances in each of the electrode chambers; and (iii) operate chambers when liquids flow in the same or in opposite directions thus significantly extending the device's functional capacities.

In applied electrochemistry, portable devices for water processing are used which operate in flow mode. In the available devices, such mode results, however, in increased dimensions inasmuch as the device's casing incorporates a container from which water to be processed runs into the device's electrode chamber and then to the consumer See Japan Patent No. 56152786 A. Moreover, such devices do not allow the user to process solutions in the anode and cathode chambers concurrently. It is also not possible to sequentially process solutions first in one chamber and then in another.

Microwater, a device based on the flow-mode processing of solutions in the anode and cathode chambers, is available on the market. U.S. Pat. No. 5,051,161. However, this apparatus features significant dimensions so that it can not be used as a portable device. Moreover, the electrochemical processing is incorporated in this device into the hydraulic circuit so that only products with pre-set characteristics can be produced. This device also does not allow processing different chemical solutions in the electrode chambers or use of different processing modes. In particular, it is not possible to sequentially process solutions first in one electrode chamber, and then in another.

The casing of the current invention includes holes in which quick-disconnect hydraulic connections and an electric connector are tightly installed. Such a design precludes penetration of liquids into the casing. As a result, the device's operational characteristics and safety are improved. The electric connector installed makes it possible to use various power supply units (both stationary and portable) so that the device's functional capacities are additionally extended. The device can be electrically supplied from any external power source, for example, an adapter (containing a step-down transformer, rectifier, and a current stabilizer), or a car or solar battery. The number of leads-in and their placement depend on the device dimensions. If a minor electrode-diaphragm unit is used (up to 10-cm long) one anode and one cathode lead can be used. When 20-cm to 30-cm long units are used, two anode leads should be used (connected to the anode's end parts), and one cathode lead connected to the cathode's central part.

The quick-disconnect hydraulic connections make it possible to run the electrode-diaphragm unit in different modes: liquids can be processed in electrode chambers in parallel or counter flows. The quick-disconnect connections and flexible pipes allow the user to employ different hydraulic circuits for processing liquids and, owing to this, to use the device for the variety of purposes. Liquids can be supplied to the processing, and the processed products can be collected, through flexible pipes using containers (which may be included in the device's set) or the device can be run in some other way.

The unit's diaphragm is a cylinder made of ceramics on the basis of aluminum and zirconium oxides, which is installed coaxially to the electrodes. The diaphragm is robust and resistant to aggressive chemicals. The diaphragm features pores of a constant size and a hydrophilic surface that suppresses sticking of electrolytic gas bubbles to the diaphragm's work surfaces. The diaphragm material makes it possible to produce sufficiently thin diaphragms so that the power consumption can be diminished due to the decreased inter-electrode gap. The diaphragms, even thin ones, feature sufficient durability which allows them to endure comparatively high pressures without deformations. This extends the device's functional capacities and ensures that the solutions produced have standard properties. In addition, the diaphragm can be easily cleansed from water salts which are the main reason for diaphragms being polluted when processing aqueous solutions.

The cylindrical diaphragm's inner and outer surfaces, and also the anode's outer surface, and the cathode's inner surface are advantageously polished. This makes it possible to reliably run the device in any position (horizontal, vertical or slant). The pressure of the liquid being processed is sufficient for the efficient removal of the electrolytic gas bubbles so that their emergence does not affect the process parameters.

It is recommended that the electrode-diaphragm unit contain coaxially installed cylindrical inner anode, outer cathode, and a diaphragm made of ceramics on the basis of aluminum and zirconium oxides, possibly with yttrium oxides added. The diaphragm partitions the interelectrode space into the anode and cathode chambers. The diaphragm is 0.4 mm to 3 mm thick.

The electrodes should be made of materials which do not dissolve in the process of the electrochemical processing. Preferably, titanium electrodes plated with a mixture of ruthenium and titanium dioxides or electrodes plated with noble metals or oxides of manganese, tin, cobalt are used as anodes. Preferably, pyrographite-plated polished titanium, tantalum or zirconium or glass-carbon, etc. are used as cathodes. The cathode, anode, and diaphragm may be installed in dielectric bushings. The bushing's design makes it possible to tightly seal the electrode chambers. Each bushing has channels (connected to the anode and cathode chambers) that open to the bushing's side surface and have nipples. The interelectrode distance may be 2.5 mm to 12.0 mm long. A unit's dimensions mainly depend on the cathode's size which is usually 50 mm to 300 mm.

The anode may be (i) solid, or (ii) hollow, or (iii) consist of more than one part manufactured from the same or different materials which are attached to each other using different technologies depending on the materials used: beam laser welding, vacuum welding, mechanical fixing, etc. Each bushing may have an axial channel in which the anode is tightly installed. The anode's end may bear a thread which makes it possible to place the elements that fix the unit, such as washers or nuts, on the bushing's face surface. Current leads may also be connected to the anode's ends so that the anode is polarized uniformly.

Dimensions of the electrode-diaphragm unit depend on the device's purpose. In the case of water processing, comparatively small (up to 10 cm) units may be used. If high productivity and processing rate are needed, the units with the dimensions up to 30 cm may be used. It is recommended that electrode-diaphragm units of devices which produce certified disinfecting and sterilizing solutions be used. Suitable lectrode-diaphragm units for use with the invention are those described in RU Patent Nos. 2,042,639; 2,078,737; and 2,145,940 or in U.S. Pat. No. 5,635,040.

BRIEF DESCRIPTION OF THE DRAWINGS

Figure 1:
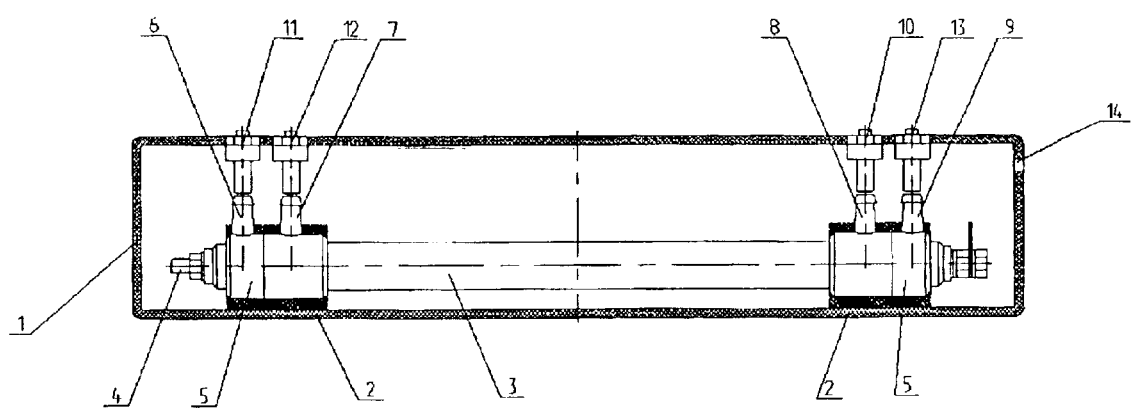
Figure 2:
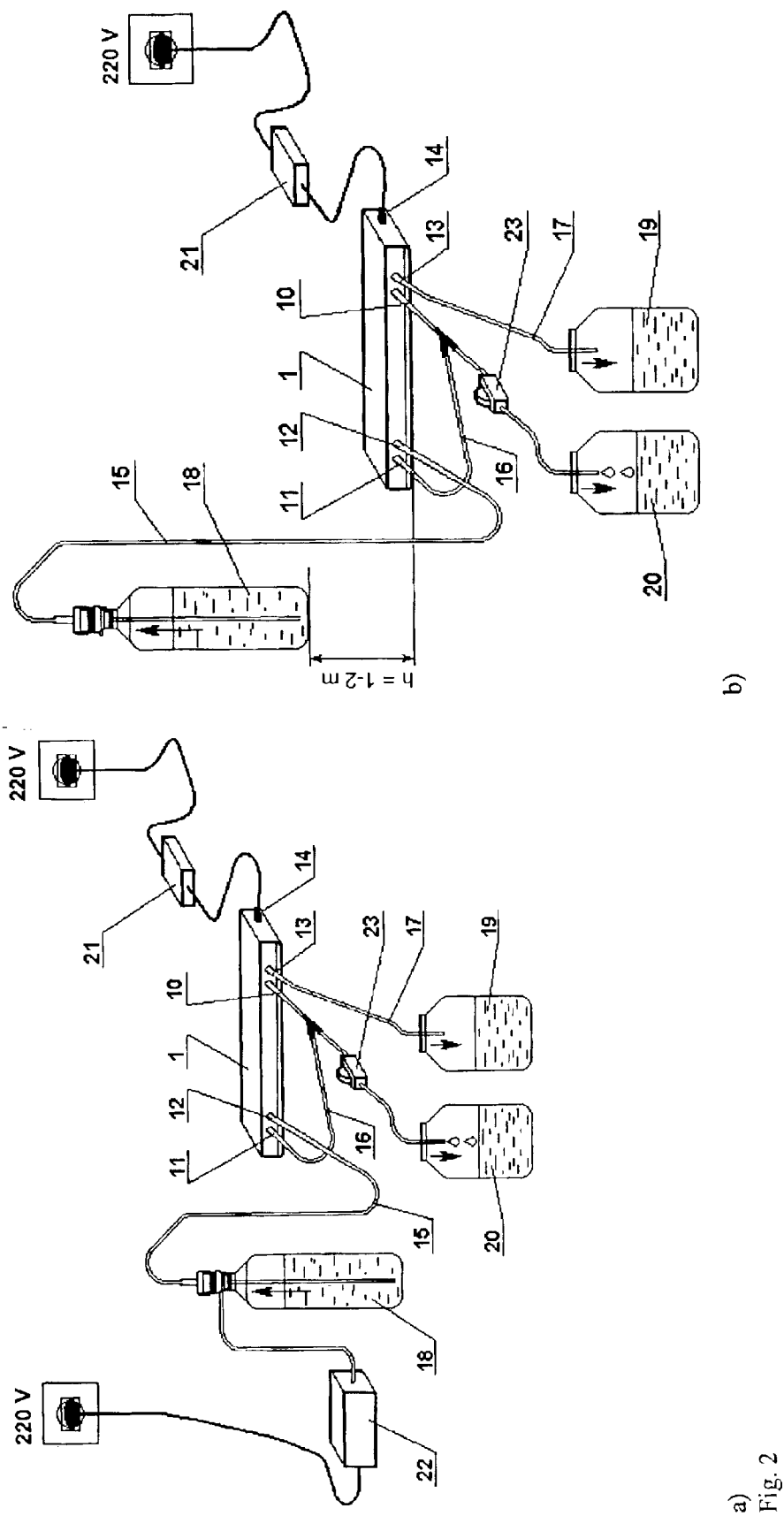
Figure 3:
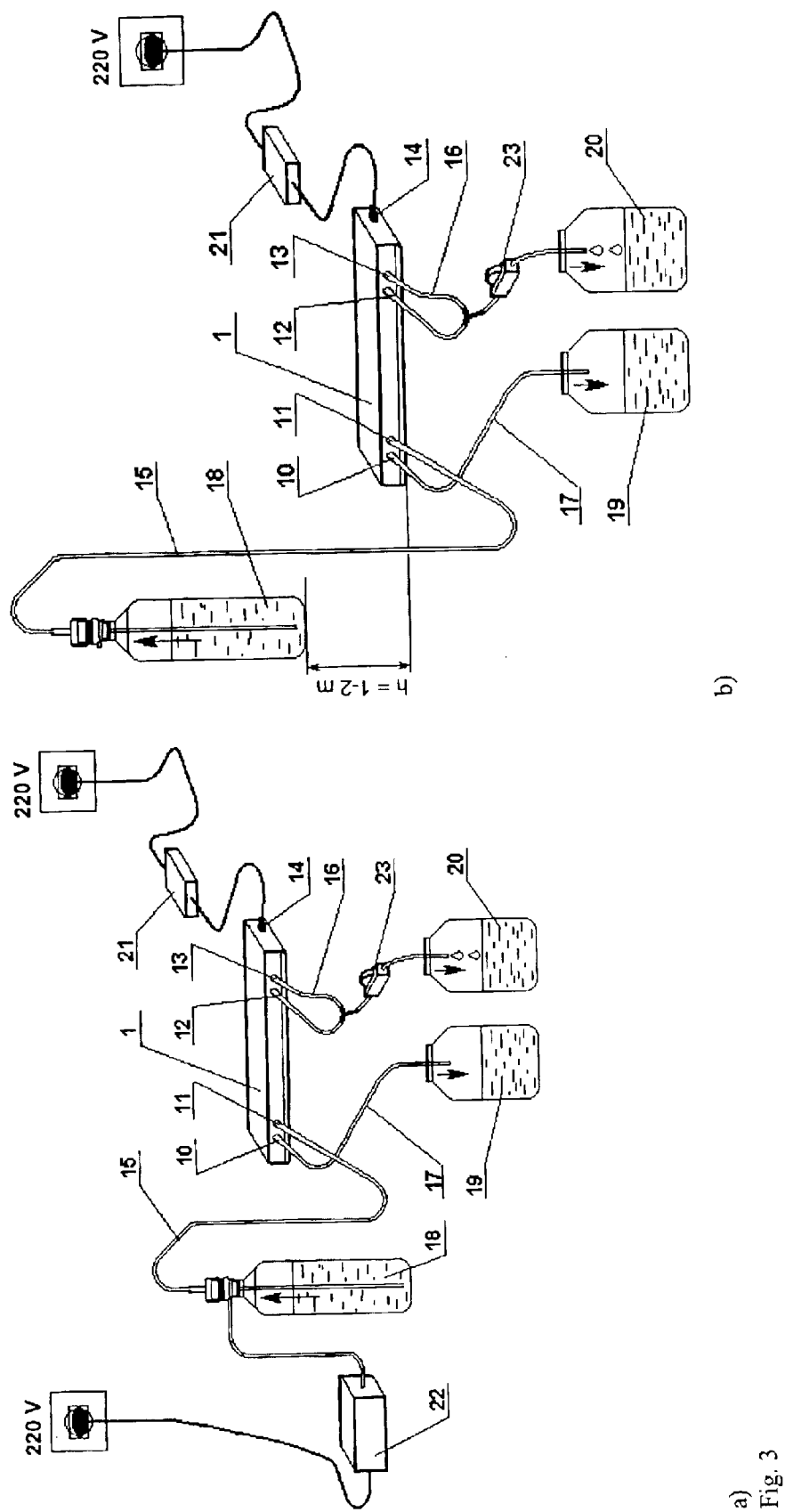
Figure 4:
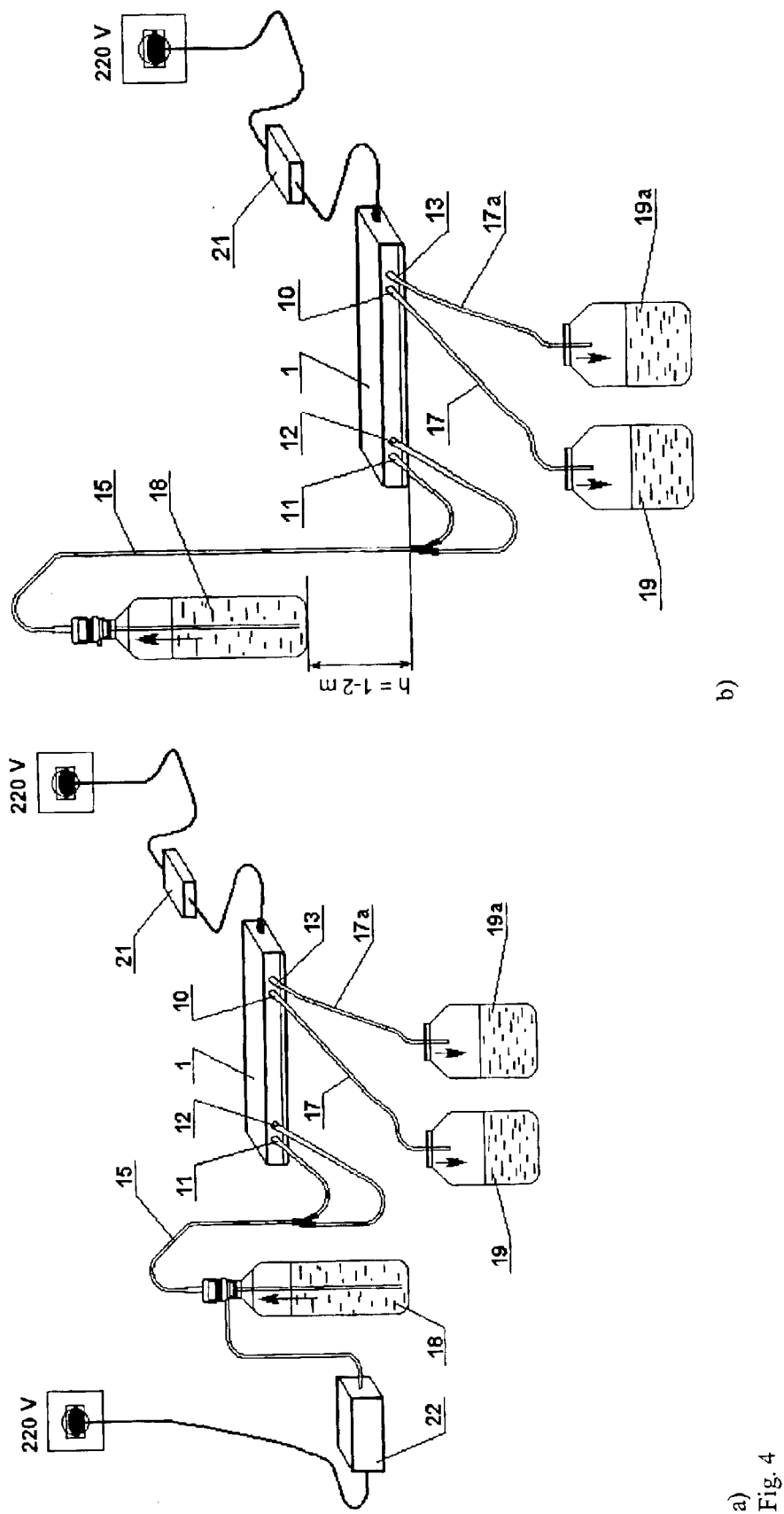
Figure 5:
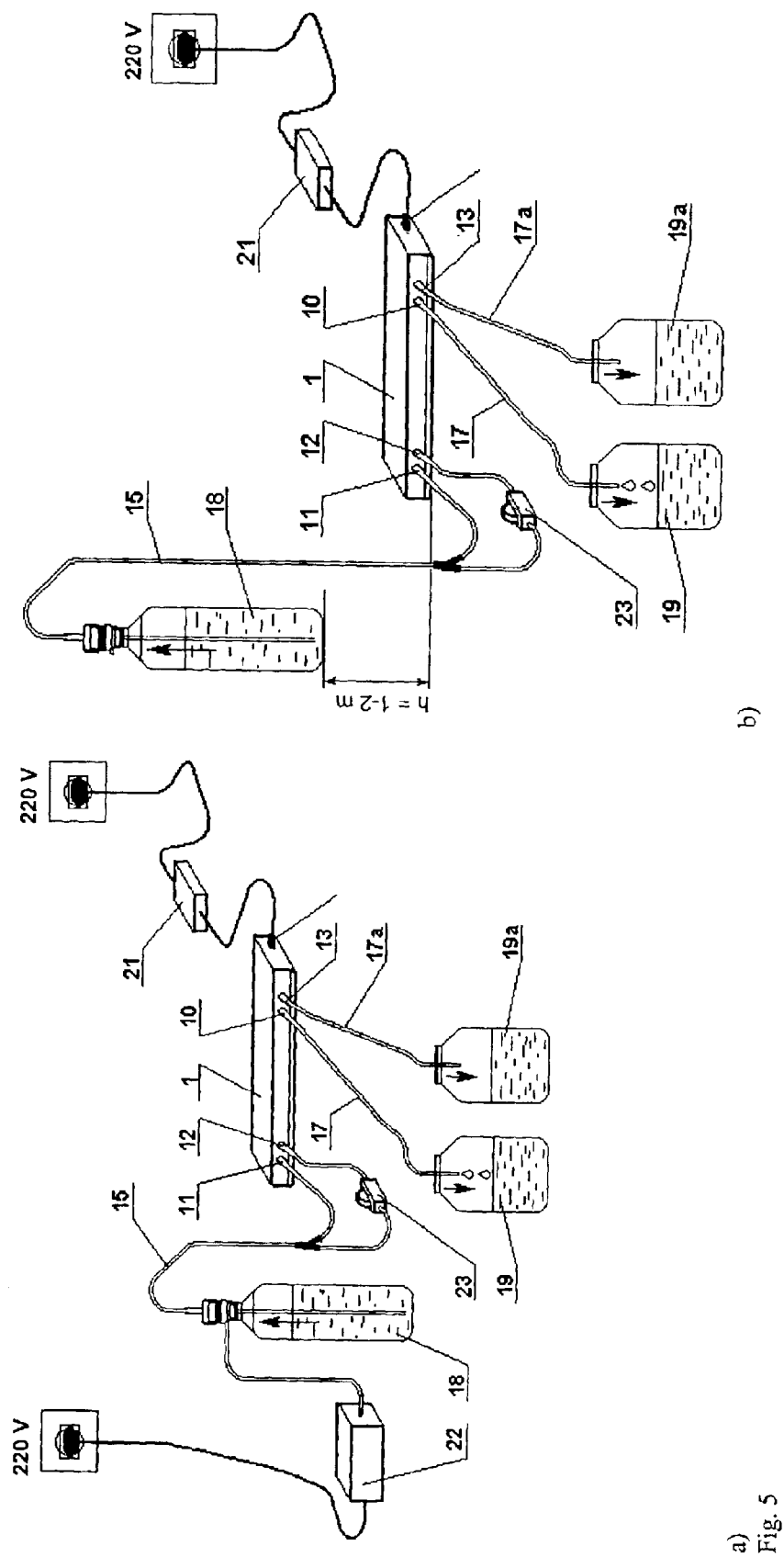
Figure 6:
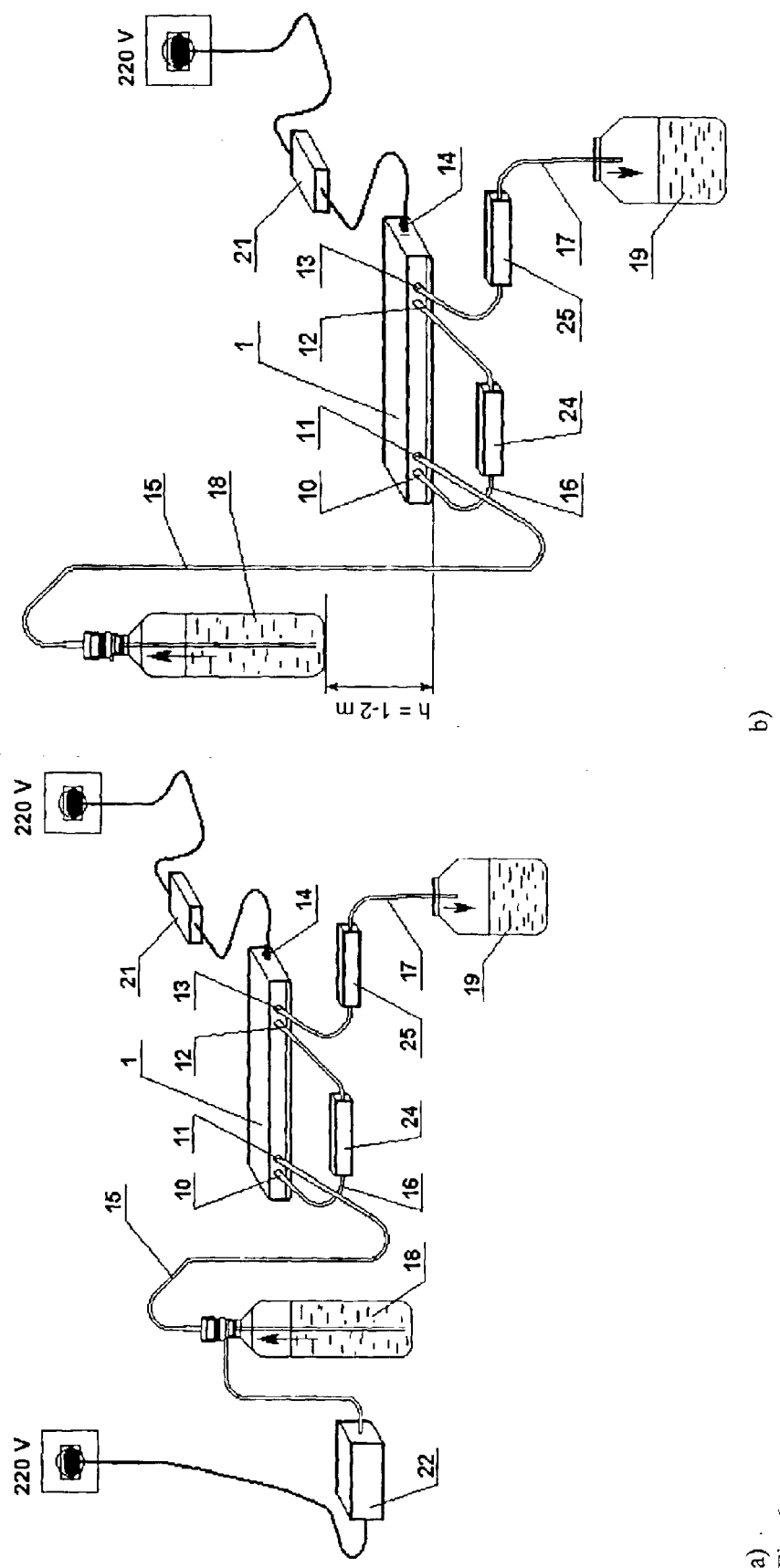
Figure 7:
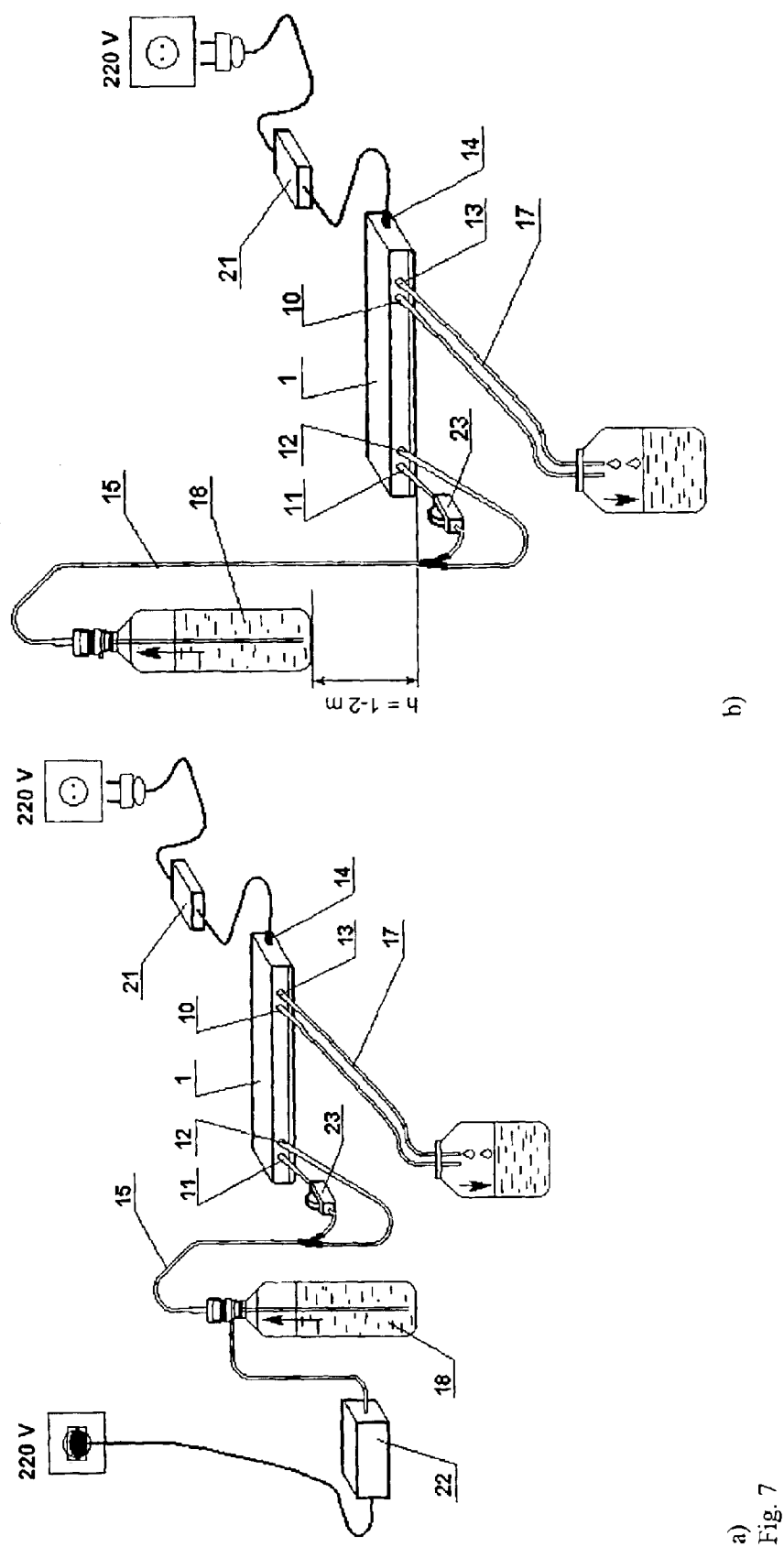

Having thus described the invention in general terms, reference will now be made to the accompanying drawings, which are not necessarily drawn to scale, and wherein:

FIG. 1 is a cross-sectional view of an embodiment of the invented device;

FIG. 2 is a diagram of a manner of connecting the device of the invention in order to produce disinfecting and washing solutions;

FIG. 3 is a diagram of an alternative manner of connecting the device of the invention in order to produce disinfecting and washing solutions;

FIG. 4 is a diagram of a second alternative manner of connecting the device of the invention in order to produce disinfecting and washing solutions;

FIG. 5 is a diagram of a third alternative manner of connecting the device of the invention in order to produce disinfecting and washing solutions;

FIG. 6 is a diagram of a manner of connecting the device of the invention in a hydrolic circuit for purifying water; and FIG. 7 is a diagram of a manner of connecting the device of the invention in order to flush the device to remove cathode deposits.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, the invented device for processing liquids comprises a casing 1 in which electrode-diaphragm unit 2 is fixed using elastic fillings, preferably a synthetic spongy material. The electrode-diaphragm unit comprises a cylindrical outer cathode 3, cylindrical inner anode 4 (only the end parts thereof are shown in FIG. 1), and a ring-shaped diaphragm partitioning the inter-electrode space into anode and cathode chambers (not visible in FIG. 1). The anode, cathode, and diaphragm are coaxially and tightly fixed on bushings 5. One bushing 5 bears nipples 6 and 7, and another bushing 5, nipples 8 and 9. Nipples 7 and 8 are designed as inlets and outlets (or vice versa) of the liquid to be processed into the cathode chamber, and nipples 6 and 9, into the anode chamber, respectively. The casing has holes 10, 11, 12, and 13 in which quick-disconnect hydraulic connectors may be coupled inside the casing with nipples 8, 6, 7, and 9, respectively in a liquid-tight manner. The casing also has a hole 14, through which an electric connector may be threaded for connection to the leads of the electrodes inside the casing (not shown in the FIG. 1).

Referring to FIGS. 2a and 2b, the invented apparatus may also include flexible pipes 15, 16, and 17; a container 18 for the original solution; containers 19 and 20 for the processed and intermediate products, respectively; a power supply unit 21; and a device 22 for creating overpressure. The apparatus may also contain flow governor 23.

Referring to FIGS. 6a and 6b, if the device is used for purifying water, it may also include an electric kinetic reactor 24 for removing colloidal heavy metal hydroxides and a catalytic dechlorination reactor 25. The electric kinetic reactor 24 is a flow-type reactor filled with crystals of a chemically active substance, for example, quartz granules. The volume of the electric catalytic reactor equals one to fifty volumes of the electrode-diaphragm unit's cathode chamber. A flow-type reactor filled with carbon-manganese dioxide catalyst may be used as the catalytic reactor 25.

The device's specific hydraulic circuit and operation mode depend on the device's purpose. FIGS. 2a and 2b show a hydraulic circuit of the device designed for obtaining a disinfecting solution with ANK-type neutral chemically activated anolyte; a pH of 6.8–7.8; oxidation-reduction potential (ORP) with respect to a silver-chloride reference electrode from +400 to +800 mV; and concentration of oxidants from 100 to 400 mg/l from an initial sodium-chloride solution with a concentration of 0.5–5.0 g/l. Such solutions may be used in dentistry, general-purpose clinics, and hospitals in rural areas. If an ANK-type anolyte is produced using the layout shown in FIG. 2, the processed solutions pass through anode and cathode chambers in the electrode-diaphragm unit in parallel flows.

Continuing to refer to FIGS. 2a and 2b, the container 18 with the original solution to be processed is preferably connected through quick-disconnect connection 12 (FIGS. 2a and 2b) to nipple 7 of the electrode-diaphragm unit (see FIG. 1) so that the solution to be processed is supplied to the cathode chamber using a flexible pipe 15. The solution after having been processed in the cathode chamber is supplied from hydraulic connection 10 through nipple 8 (FIG. 1) and flexible pipe 16 to hydraulic connection 11 and, through nipple 6 (FIG. 1), to the anode chamber. The processed solution is transported through nipple 9 (FIG. 1) of hydraulic connection 13 and flexible pipe 17 to container 19. Flow governor 23 installed on pipe 16 makes it possible to transport part of the solution processed in the cathode chamber to container 20.

The connector 14 of the casing 1 is connected to a power supply unit, such as an AC power supply unit comprising a step-down transformer and rectifier. So that the original solution to be processed is supplied, an overpressure device 22 is installed on the container 18. The overpressure device may be a compressor which has power-supplied from an AC power source. As shown in FIG. 2b, the original solution can also flow due to hydrostatic pressure. Preferably, the container 18 is placed 1–2 m higher than the casing 1.

Referring to FIGS. 3a and 3b, a hydraulic circuit of a device for obtaining the same ANK-type anolyte disinfecting solution when the anolyte is produced with the processed solutions flowing (in the anode and cathode chambers) in the opposite directions. Such mode makes it possible to significantly reduce the amount of the catholyte disposed to the drainage.

In such an arrangement, container 18 with the original solution to be processed is connected through flexible pipe 15 to hydraulic connection 11 through which the solution is supplied into the cathode chamber. From hydraulic connection 12, the processed solution through flexible pipe 16 and hydraulic connection 13 is supplied to the anode chamber. The processed solution is transported to container 19 for the finished product through the hydraulic connection 10 and flexible pipe 17. Flow governor 23 installed on pipe 6 allows part of solution processed in the cathode chamber to be drained to container 20. The original solution is transported to the processing from container 18 either using overpressure device 22 (FIG. 3a) or due to the hydrostatic pressure (FIG. 3b). In the latter case, container 18 is placed 1–2 m higher than casing 1.

Referring to FIGS. 4a and 4b, a hydraulic circuit of the device is shown for producing an A-type anolyte disinfecting solution with pH less than 5.0; ORP from +800 to +1200 mV; and oxidant concentration of 180–500 mg/l; and a K-type catholyte washing solution with pH over 9 and ORP from –700 to –820 mV. The solutions are produced when the original solution passes through the anode and cathode chambers of the electrode-diaphragm unit in parallel flows.

In this embodiment, container 18 with the original solution to be processed is connected through flexible pipe 15 to quick-disconnect hydraulic connections 11 and 12 (FIGS. 4a and 4b) through which the solution is supplied to the anode and cathode chambers, respectively. The solution processed in the cathode chamber (catholyte of K-type, i.e. with pH over 9) is transported through hydraulic connection 10 and flexible pipe 17 to container 19. The processed solution (anolyte of A-type, i.e. with pH less than 5) is transported through hydraulic connection 13 and flexible pipe 17a to container 19a for finished products. As before, connector 14 of casing 1 is connected to a power supply unit 21. The original solution to be processed is transported from container 18 either using overpressure device 22 (FIG. 4a) or due to the hydrostatic pressure (FIG. 4b). In the latter case, the container 18 is preferably placed 1–2 m higher than casing 1.

Referring to FIG. 5, a hydraulic circuit of the device is shown for producing the AN-type anolyte disinfecting solution with pH 5.0–7.0; ORP from +600 to +900 mV; and oxidant concentration 100–1,100 mg/l. The AN-type anolyte is produced when the solution passes in parallel flows through the anode and cathode chambers of the electrode-diaphragm unit. In this embodiment, container 18 with the original solution to be processed is connected through flexible pipe 15 and quick-disconnect hydraulic connections 11 and 12 (FIGS. 5a and 5b) to the anode and cathode chambers, respectively. Flow governor 23 installed on the pipe before connection 12 controls the ratio of the flows passing through the anode and cathode chambers. The processed solution (K-type catholyte) is transported using hydraulic connection 10 and flexible pipe 17 to container 19. The other processed solution (AN-type anolyte) is transported using hydraulic connection 13 and flexible pipe 17a to the container 19a. As before, connector 14 of casing 1 is connected to power supply unit 21. The original solution to be processed is transported from container 18 either using overpressure device 22 (FIG. 5a) or due to the hydrostatic pressure (FIG. 5b). In the latter case, container 18 is placed 1–2 m higher than casing 1.

Referring to FIGS. 6a and 6b, a hydraulic circuit of the device is shown for purifying water in which additional processing in a catalytic reactor is carried out to dechlorinate water.

In accordance with this embodiment, container 18 with the original water to be purified is connected through flexible pipe 15 to the quick-disconnect hydraulic connection 12 through which it is supplied to the cathode chamber. The water having been processed in the cathode chamber is transported through hydraulic connection 10 and flexible pipe 16 to hydraulic connection 11 through which it is supplied to the anode chamber. An electric catalytic reactor 24 is installed on pipe 16. The water having been processed in the anode chamber is transported through the hydraulic connection 13 and flexible pipe 17 to container 19 for the purified water. If necessary, the catalytic reactor 25 may be installed on pipe 17 so that the water can be cleansed from the excessive active chlorine that was produced in the anode chamber. The original solution can be transported from container 18 using the overpressure device 22 (FIG. 6a). Otherwise, the original solution can flow due to the hydrostatic pressure (FIG. 6b). In this case, container 18 is placed 1–2 m higher than casing 1.

Referring to FIGS. 7a and 7b, a hydraulic circuit used for flushing the device with an acid solution is shown. In this embodiment, container 18 with an acid solution for flushing is connected through flexible pipe 15 to hydraulic connections 11 and 12 through which the acid solution is supplied to the anode and cathode chambers, respectively. Flow governor 23 installed on the pipe before connection 11 controls the ratio of the flushing solution volumes passing through the anode and cathode chambers. The flushing solution having passed through the chambers is disposed through the hydraulic connections 10 and 13 to a container. As before, the original solution is transported from container 18 either using overpressure device 22 (FIG. 7a) or due to the hydrostatic pressure (FIG. 7b). In the latter case, container 18 is placed 1–2 m higher than casing 1.

EXAMPLES

Examples given below illustrate some of the invented device's capacities.

An embodiment of the device called Installation STEL-Kompakt-01 is designed for producing electrochemically activated ANK-, AN-, and A-type anolytes, and also K- and KN-type catholytes from the sodium chloride aqueous solution with the 0.5 to 5.0 g/l concentration. Such solution can be prepared using either chemically pure salt and distilled (or purified for the hemodialysis) water or common salt and tap or natural sweet water from surface or underground sources.

The electrode-diaphragm unit of the device used in the examples below contains a cylindrical inner anode 8 mm in diameter; a diaphragm 0.7 mm thick and 210 mm in diameter, made of ceramics on the basis of the oxides of aluminum and zirconium with yttrium added (80 and 20 mass percent, respectively) and the size of pores 0.8 $\mu$m; and a cylindrical outer cathode with the inner diameter 14 mm. The electrodes and diaphragm are coaxially installed in dielectric bushings. The bushings have axial channels in which the anode's end parts (bearing thread) are installed. The rigidity of the construction is ensured by fillings and fixing elements (washers and nuts) placed on the bushings' face surfaces. Each bushing has two channels through which the processed solution can be transported to and from the unit's anode and cathode chambers. The inter-electrode gap is 3 mm wide. The volume of the cathode and anode chamber is 10 ml and 7 ml, respectively.

Example 1

The device was used to produce anolyte and catholyte solutions from the sodium-chloride solution (concentration 3 g/l) using the layout shown in FIG. 4a. Table 1 contains data obtained as a result of running the exemplary device and a prototype device in comparison with available commercial devices.

TABLE 1

Comparative Characteristics of Different Electrochemical Devices

| Indices | Device type | | | |
|---|---|---|---|---|
| | Prototype device | Nichiden ™ ND-202 (Japan) | Micro-water ™ (Japan) | STEL-KOMPAKT-01 (proposed device) |
| Productivity, 1/hour | | | | |
| anolyte | 1–3 | 0.2–0.6 | 60–200 | 10–20 |
| catholyte | 3–10 | 0.2–0.6 | 60–200 | 10–20 |
| total | 4–13 | 0.4–1.2 | 100–300 | 20–40 |
| Sodium chloride concentration in the initial solution, g/l | 2–5 | 1–2 | 0.1–0.5 | 0.2–5 |
| Oxidant concentration in the anolyte, mg/l | 30–100 | 10–50 | 5–30 | 100–500 |
| Anolyte ORP, mV | +360–+900 | +400–+1,000 | +380–+570 | +500–+1,200 |
| Catholyte ORP, mV | −100–−700 | −200–−600 | −250–−560 | −200–−800 |

TABLE 1-continued

Comparative Characteristics of Different Electrochemical Devices

| Indices | Device type | | | |
|---|---|---|---|---|
| | Prototype device | Nichiden ™ ND-202 (Japan) | Micro-water ™ (Japan) | STEL-KOMPAKT-01 (proposed device) |
| Anolyte pH | 3.4 | 3.5 | 5.2 | 2.6 |
| Catholyte pH | 10.5 | 10.2 | 9.8 | 11.3 |
| Specific power consumption for the synthesis of oxidants, W-hour/g | 30 | 50 | 40 | 15 |
| Processing mode | In closed volume | In closed volume | In flow | In flow |
| Device mass, kg | 1 | 0.4 | 5 | 0.8 |
| Dimensions, cm | Diameter 15 × 15 | Diameter 6 × 8 | 23 × 11 × 28 | 30 × 6 × 3 |

Example 2

Samples of polluted water were purified in the exemplary device using the layout shown in FIG. 6a. A 30-ml container filled with 2.5 mm to 3.0 mm quartz crystals was used as an electric kinetic reactor. A container filled with carbon-manganese dioxide catalyst was used for the water dechlorination. Data on purification are shown in Tables 2 and 3. The displayed data are obtained for regular potable water and also for specially prepared aqueous solutions contaminated with microbes. The results obtained are compared to similar results obtained using Brita™, a commercial water purification device.

TABLE 2

Quality Indices of Tap Water Before and After Processing in Brita and STEL-Kompakt-01

| | STEL-Kompakt-01 | | Brita ™ | |
|---|---|---|---|---|
| Indices | Before processing | After processing | Before processing | After processing |
| Smell (scores) | 1 | 0 | 1 | 0 |
| Turbidity (ml/dm$^3$) | 1.2 | 0.9 | 1.2 | 0.85 |
| Color (grades) | 17 | 7 | 17 | 8 |
| pH | 7.10 | 7.15 | 7.10 | 7.05 |
| ORP (mV) | +270 | −120 | +270 | +285 |
| Iron (ml/dm$^3$) | 0.22 | 0.05 | 0.22 | 0.07 |
| Chloroform (ml/dm$^3$) | 0.014 | 0.007 | 0.014 | 0.008 |
| Zinc (ml/dm$^3$) | 0.012 | <0.005 | 0.012 | <0.005 |
| Copper (ml/dm$^3$) | 0.066 | 0.004 | 0.066 | 0.005 |
| Total microbial number, CFU/ml | 40 | 1 | 40 | 35 |
| Thermo tolerant Coliform bacteria, piece/100 ml | 3 | 0 | 3 | 3 |

In order to obtain more reliable results, we have conducted experiments with specially prepared solutions containing pre-set (and considerably exceeding regular) concentrations of chemical and microbiological contaminants.

TABLE 3

Results of Purifying Artificial Test Solutions Using Brita and STEL-Kompakt-01

| | STEL-Kompakt-01 | | Brita ™ | |
|---|---|---|---|---|
| Indices | Before processing | After processing | Before processing | After processing |
| Cadmium (mg/dm$^3$) | 0.02 | 0.002 | 0.02 | 0.05 |
| Aluminum (mg/dm$^3$) | 2.5 | 0.65 | 2.5 | 0.7 |
| Phenol (mg/dm$^3$) | 0.02 | 0.0015 | 0.02 | 0.0025 |
| Benzene (mg/dm$^3$) | 1.5 | 0.7 | 1.5 | 0.8 |
| Zinc (mg/dm$^3$) | 2.0 | 0.13 | 2.0 | 0.22 |
| Total microbial number, CFU/ml | $7.0 \times 10^2$ | 63 | $7.0 \times 10^2$ | $5.0 \times 10^2$ |

INDUSTRIAL APPLICATIONS

The data quoted show that the proposed device makes it possible to increase the device productivity, reduce costs of the energy needed for processing, and to extend the device's functional capacities. Owing to this, the proposed device can be used to produce required quantities of electrochemically-activated solutions (A-, AN-, and ANK-type anolytes, and K-type catholytes) from water or low-concentration sodium-chloride aqueous solutions and also to cleanse water from microorganisms, heavy metal ions, and organic chemicals (herbicides, pesticides, phenols, surface-active substances, and oil products). The proposed device can be used both indoors and outdoors. The Stel-Kompakt-01 device also allows the production of certified chemicals, which is not possible in available flow-type electrochemical systems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A portable device for the electrochemical processing of liquids, comprising:
    a dielectric casing;
    an electrode-diaphragm unit fixed within said casing, comprising:
        a cylindrical inner electrode having at least one lead;
        a cylindrical outer electrode having at least one lead, said outer electrode coaxial with and mounted around the inner electrode thereby defining an inter-electrode space;
        a cylindrical inter-electrode diaphragm, coaxial with said inner and outer electrodes, partitioning the inter-electrode space into an anode chamber and cathode chamber, wherein the diaphragm is made of ceramic material; and
        elements for inputting and outputting liquid to and from the anode and cathode chambers;
    hydraulic ports disposed through said dielectric casing corresponding to said liquid inputting and outputting elements;
    quick-disconnect hydraulic connectors installed within said hydraulic ports, each connected on one end to a respective liquid inputting and outputting element, and each open on the opposing end to the outside of the casing; and at least one electrical port disposed through said dielectric casing for passage of a power supply cable therethrough.

2. The device of claim 1, wherein the quick-disconnect hydraulic connectors have a nipple-type design.

3. The device of claim 1, further comprising:

an electric connector installed within said at least one electrical port, connected on one end to each of said electrodes, and connectable on the other end to an external power source.

4. The device of claim 1, further comprising:

flexible pipes, external to the casing, connected to said quick-disconnect hydraulic connectors.

5. The device of claim 1, wherein the inner electrode serves as the anode and the outer electrode serves as the cathode.

6. The device of claim 1, wherein the ceramic material of the diaphragm is selected from the group consisting of aluminum oxides, zirconium oxides, and combinations thereof.

7. A portable device for the electrochemical processing of liquids, comprising:

an electrode-diaphragm unit fixed within said casing, comprising:
  a cylindrical inner electrode having at least one lead;
  a cylindrical outer electrode having at least one lead, said outer electrode coaxial with and mounted around the inner electrode thereby defining an inter-electrode space;
  a cylindrical inter-electrode diaphragm, coaxial with said inner and outer electrodes, partitioning the inter-electrode space into an anode chamber and cathode chamber, wherein the diaphragm is made of ceramic material; and
  elements for inputting and outputting liquid to and from the anode and cathode chambers;
  wherein the inner and outer surfaces of the cylindrical diaphragm, outer surface of the inner electrode, and the inner surface of the outer electrode are polished;

hydraulic ports disposed through said dielectric casing corresponding to said liquid inputting and outputting elements; and at least one electrical port disposed through said dielectric casing for passage of a power supply cable therethrough.

8. The device of claim 7, wherein the inner electrode serves as the anode and the outer electrode serves as the cathode.

9. The device of claim 7, wherein the ceramic material of the diaphragm is selected from the group consisting of aluminum oxides, zirconium oxides, and combinations thereof.

10. The device of claim 7, further comprising:

an electric connector installed within said at least one electrical port, connected on one end to each of said electrodes, and connectable on the other end to an external power source.

11. A portable device for the electrochemical processing of liquids, comprising:

a dielectric casing;

an electrode-diaphragm unit fixed within said casing, comprising:
  a cylindrical inner electrode having at least one lead;
  a cylindrical outer electrode having at least one lead, said outer electrode coaxial with and mounted around the inner electrode thereby defining an inter-electrode space;
  a cylindrical inter-electrode diaphragm, coaxial with said inner and outer electrodes, partitioning the inter-electrode space into an anode chamber and cathode chamber, wherein the diaphragm is made of ceramic material; and
  elements for inputting and outputting liquid to and from the anode and cathode chambers;
  wherein the electrode-diaphragm unit is between 10 cm and 30 cm in length;

hydraulic ports disposed through said dielectric casing corresponding to said liquid inputting and outputting elements; and at least one electrical port disposed through said dielectric casing for passage of a power supply cable therethrough.

12. The device of claim 11, further comprising:

an electric connector installed within said at least one electrical port, connected on one end to each of said electrodes, and connectable on the other end to an external power source.

13. The device of claim 11, wherein the inner electrode serves as the anode and the outer electrode serves as the cathode.

14. The device of claim 11, wherein the ceramic material of the diaphragm is selected from the group consisting of aluminum oxides, zirconium oxides, and combinations thereof.

15. A portable electrochemical processing apparatus, comprising:

an enclosed dielectric casing having hydraulic ports and at least one electrical port disposed therethrough;

an electrode-diaphragm unit fixed within said casing, comprising:
  a cylindrical inner electrode having at least one lead;
  a cylindrical outer electrode having at least one lead, said outer electrode coaxial with and mounted around the inner electrode thereby defining an inter-electrode space;
  a cylindrical inter-electrode diaphragm, coaxial with said inner and outer electrodes, partitioning the inter-electrode space into an anode chamber and cathode chamber, wherein the diaphragm is made of ceramic material; and
  elements for inputting and outputting liquid to and from the anode and cathode chambers corresponding to said hydraulic ports in said casing;
  two quick-disconnect hydraulic connectors installed within said hydraulic ports of the casing, having one end in communication with said anode chamber and the exposing end connectable to an external hydraulic source; and
  two quick-disconnect hydraulic connectors installed within said hydraulic ports of the casing, having one end in communication with said cathode chamber and the opposing end connectable to an external hydraulic source.

* * * * *